E. B. WILSON.
DITCHING PLOW.
APPLICATION FILED DEC. 8, 1913.
1,101,371.
Patented June 23, 1914.
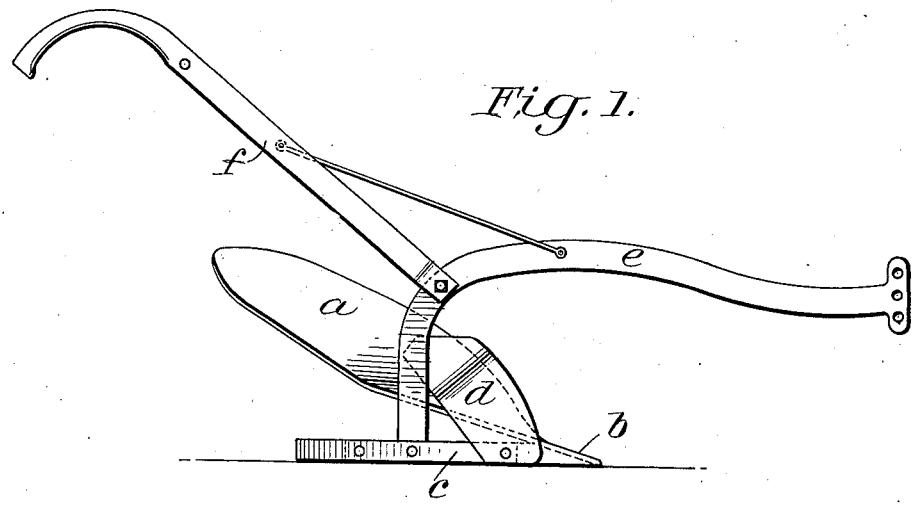
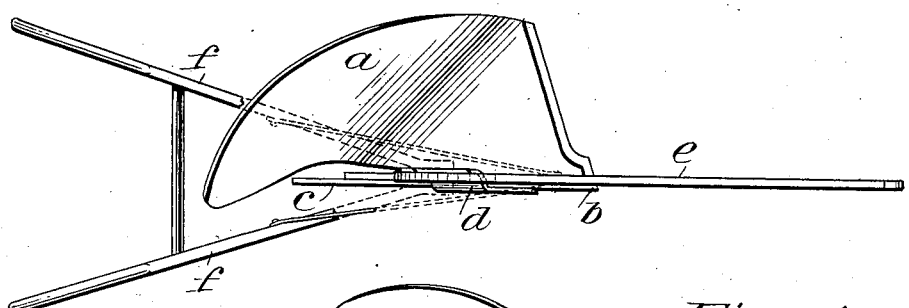
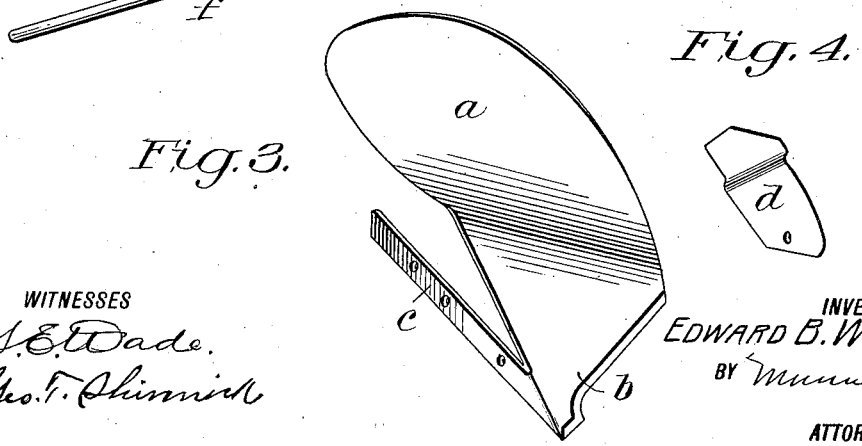
WITNESSES
A. E. Dade.
Geo. T. Shimmick.
INVENTOR
EDWARD B. WILSON
BY Munn & Co.
ATTORNEYS

UNITED STATES PATENT OFFICE.

EDWARD B. WILSON, OF WORLAND, WYOMING.

DITCHING-PLOW.

1,101,371.  Specification of Letters Patent. Patented June 23, 1914.

Application filed December 8, 1913. Serial No. 805,260.

*To all whom it may concern:*

Be it known that I, EDWARD B. WILSON, a citizen of the United States, and a resident of Worland, in the county of Bighorn and State of Wyoming, have made certain new and useful Improvements in Ditching-Plows, of which the following is a specification.

My invention is a plow adapted to be used advantageously as a substitute for the ordinary plow, for cleaning out or deepening small side ditches, or laterals, of a main irrigating ditch. Such laterals are ordinarily twice the width of a common, or single-mold-board plow, and, when such plow is used, the mold-board throws the dirt, which the share takes up, to the side on which the mold-board is located; but in this operation the lateral pressure against the mold-board tends to force the plow, as a whole, away from the side of the ditch where it should run. Hence the earth taken up is not delivered by the plow on the bank toward which the mold-board inclines, but into the ditch, so that a ridge is formed in the latter instead of on the bank, as desired.

My improved plow is provided with a mold-board whose rear upper portion is curved laterally away from the side on which the share is located, so that it discharges earth on the landside of the plow instead of on what may be called the mold-board side, and is thus adapted to run close under a bank and to deliver the earth thereon.

The details of construction and arrangement of the mold-board relative to the share are as hereinafter described, and illustrated in the accompanying drawing in which—

Figure 1 is a side elevation of my improved plow; Fig. 2 is a plan view; Fig. 3 is a perspective view of the share, mold-board, and landside, removed from the plow-beam; Fig. 4 is a plan view of a combined colter and guard.

In Figs. 1, 2, 3, *a* indicates a mold-board, *b* the share, *c* the landside, *d* the colter, and *e* the beam of my improved ditching plow. Handles *f* are attached to the beam in the usual way. The share *b* is located on the left side of the beam, and the mold-board *a*, which may be formed integrally with the share, extends upward and backward therefrom and is gradually curved spirally and laterally so that its upper portion extends to that side of the plow opposite the one on which the share is located. As shown in Fig. 2, the mold-board extends laterally in rear of the beam and across the plane of the same; thus earth taken up by the share *b* is forced up on the mold-board *a* and carried over and discharged by it on the side of the plow which is opposite the one on which the share is located. As previously indicated, this plow is designed for use in cleaning out side ditches or laterals which tend to fill up from time to time with silt and other material. On account of the slope of the share, the ordinary plow is inclined to run away from the bank of the ditch to the center of the same, and therefore throws earth to the center of the lateral; but with my improved construction and arrangement of the mold-board, the earth is lifted out or thrown to the same side of the lateral on which the plow runs. In the illustration in the drawing, the plow is provided with what is termed a left-hand share, and is thus adapted to turn the earth to the right, or to the landside; but it is to be understood that the plow may be made with the share on the right side, in which case the mold-board would extend in the opposite direction, and thus discharge earth to the left, or away from the side on which the share is located.

The mold-board and share are shown constructed integrally, but it is obvious that they may be constructed separately, and separately secured to a stock or frame. The landside *c* may also be made separate from the share, instead of integrally therewith as shown in Fig. 3.

While the plow is shown provided with handles, as common in walking plows, it is obvious that it may be constructed for attachment to an ordinary sulky frame. An elongated plate forms the colter and lateral guard *d* which trims or shaves the bank, and also prevents earth from discharging from the share on the landside of the plow.

What I claim is:—

1. A ditching plow having a share, and a mold-board which extends backward therefrom and curves spirally, its rear portion projecting laterally on the side opposite that on which the share is located, as and for the purpose specified.

2. A ditching plow having a share and mold-board connected as shown, a mold-board extending rearward from the share and its rear upper portion curving spirally laterally, and projecting in rear of the beam on that side of the plow opposite the one on which the share is located, as described.

EDWARD B. WILSON.

Witnesses:
H. B. GATES,
LYNN LANCASTER.

Copies of this patent may be obtained for five cents each, by addressing the "Commissioner of Patents, Washington, D. C."